Figure 19:
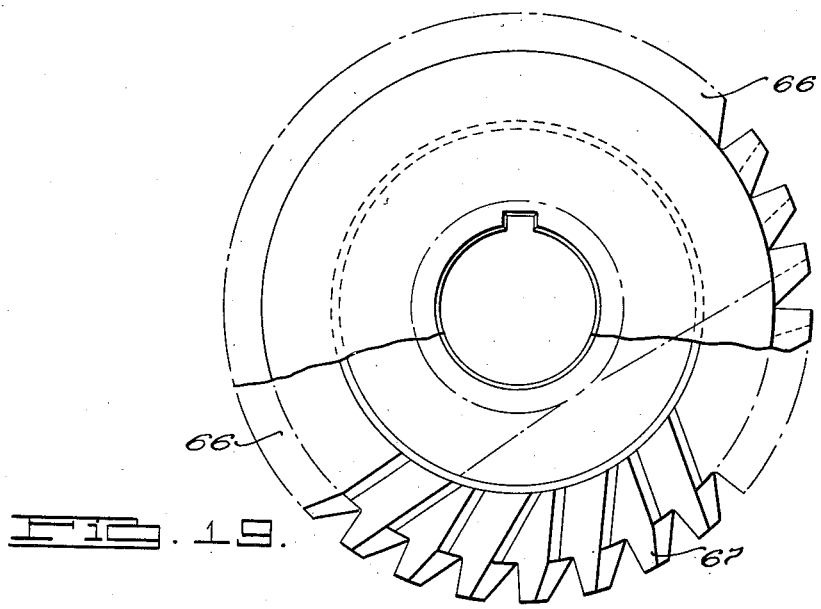

July 19, 1938.  G. R. SCOTT  2,124,126
CUTTING TOOL
Filed July 19, 1934    5 Sheets-Sheet 1
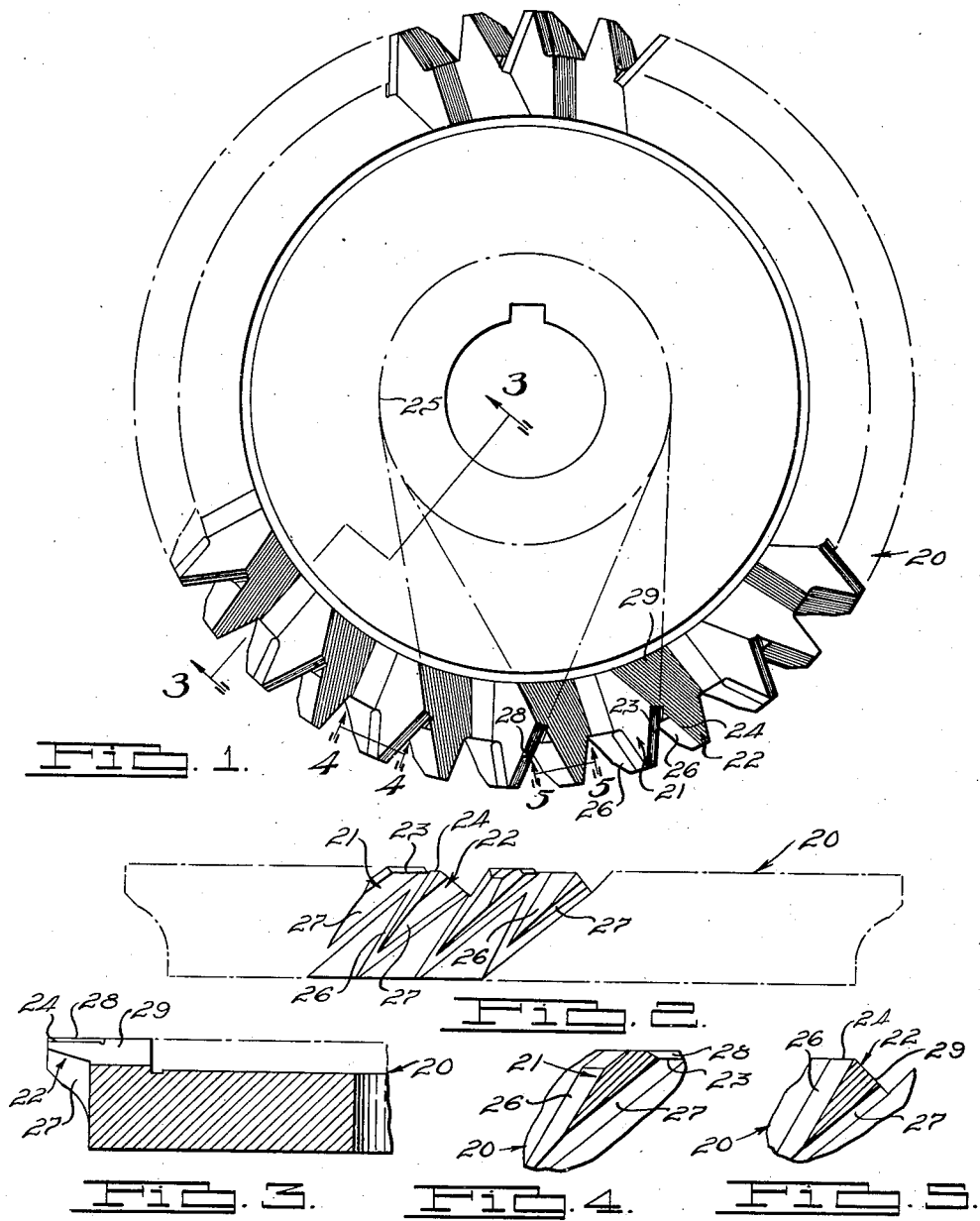
INVENTOR.
George R. Scott.
BY
ATTORNEYS.

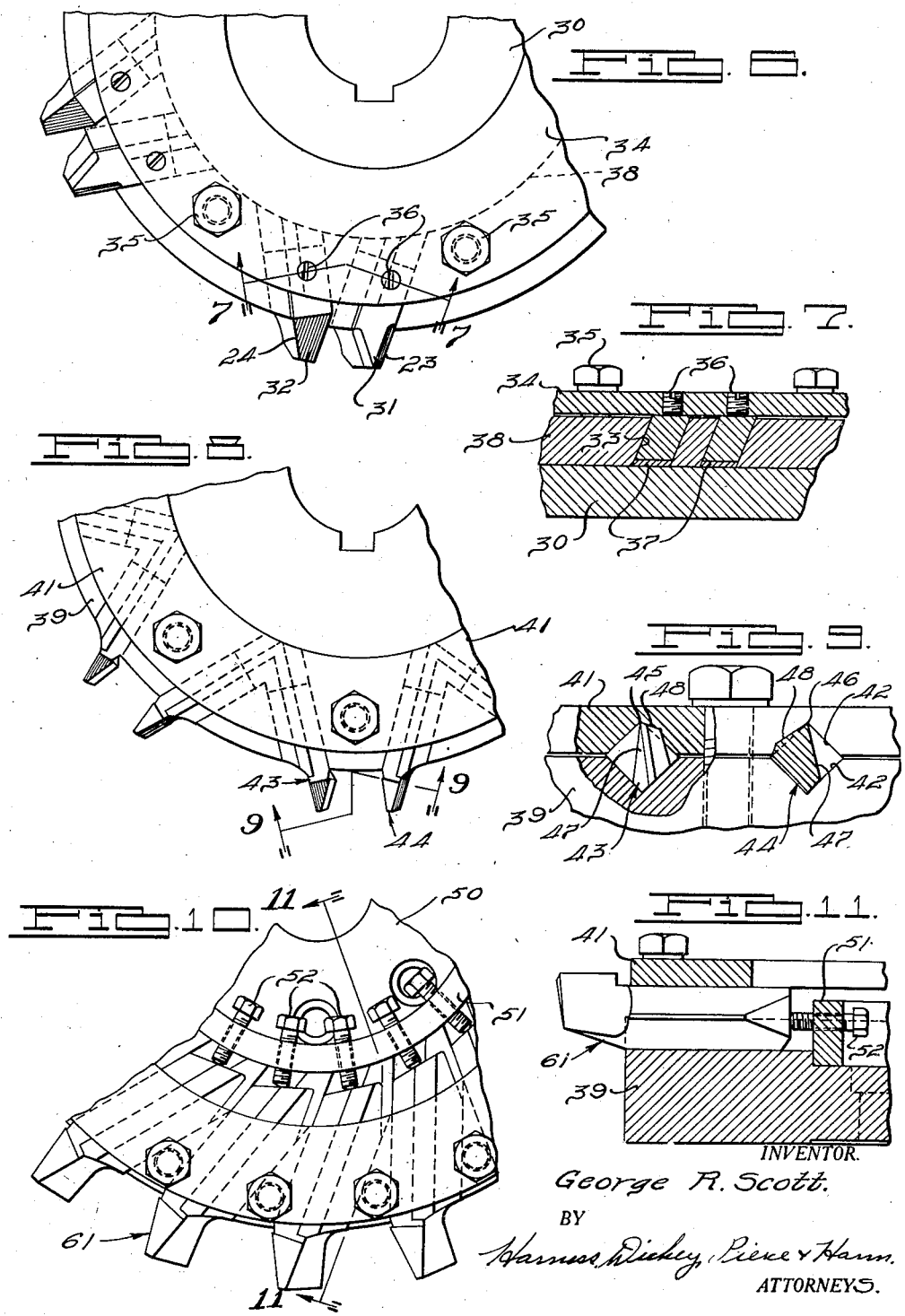

July 19, 1938.　　　G. R. SCOTT　　　2,124,126
CUTTING TOOL
Filed July 19, 1934　　　5 Sheets-Sheet 3
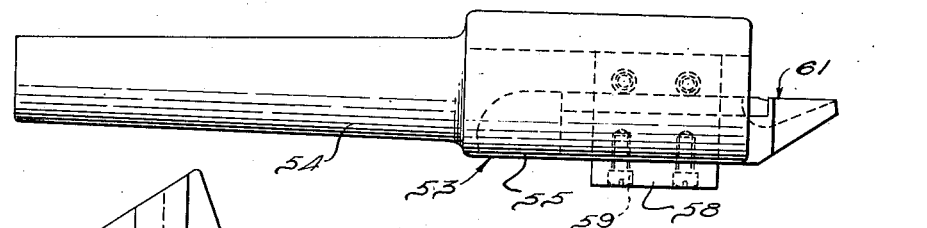
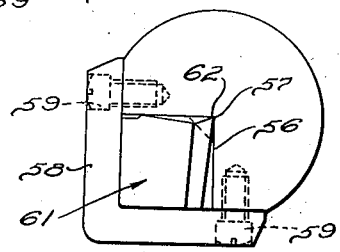
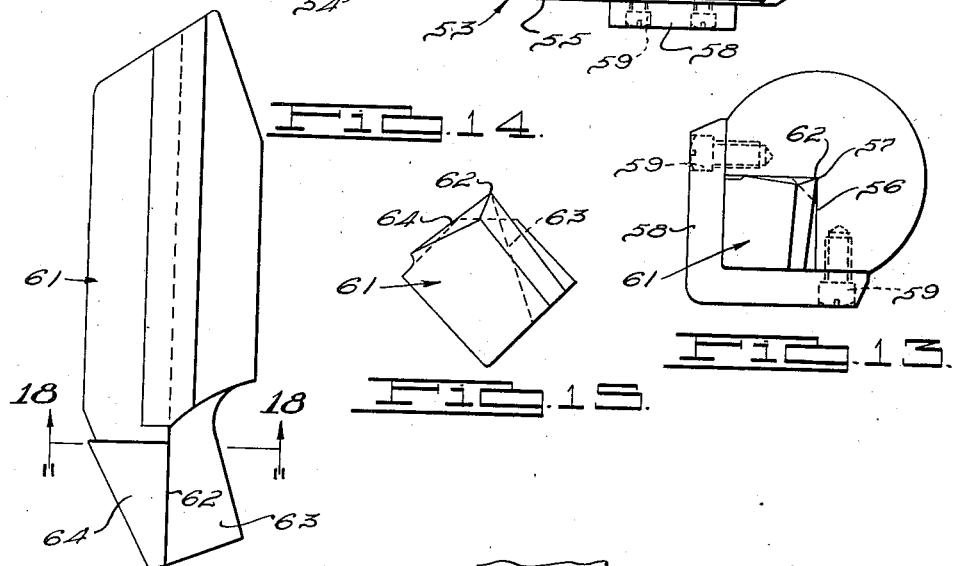
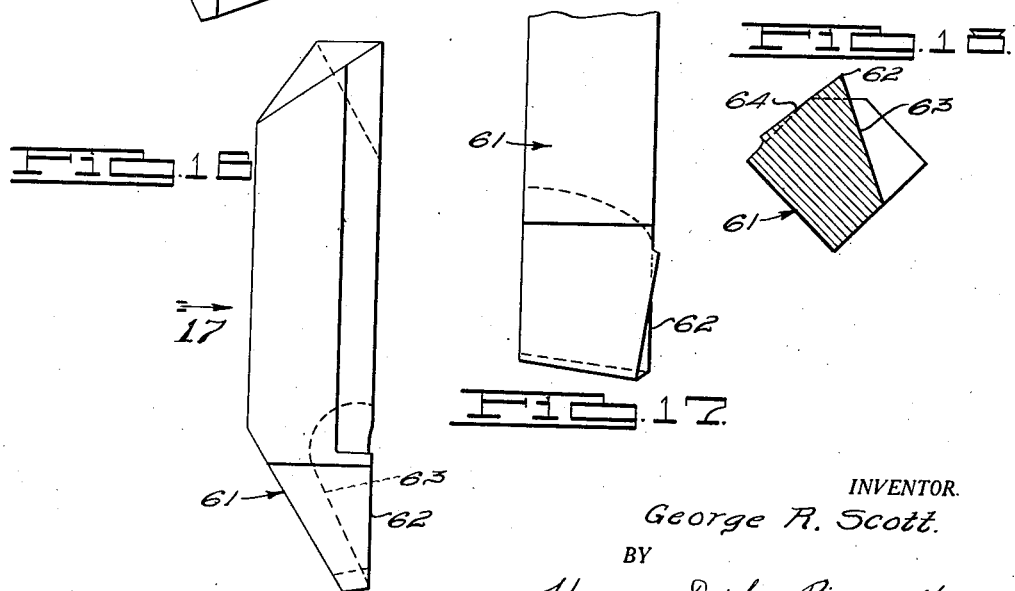
INVENTOR.
George R. Scott.
BY
　　ATTORNEYS.

July 19, 1938.　　　G. R. SCOTT　　　2,124,126
CUTTING TOOL
Filed July 19, 1934　　　5 Sheets-Sheet 4

INVENTOR.
George R. Scott.
BY
Harness, Dickey, Pierce & Hann.
ATTORNEYS.

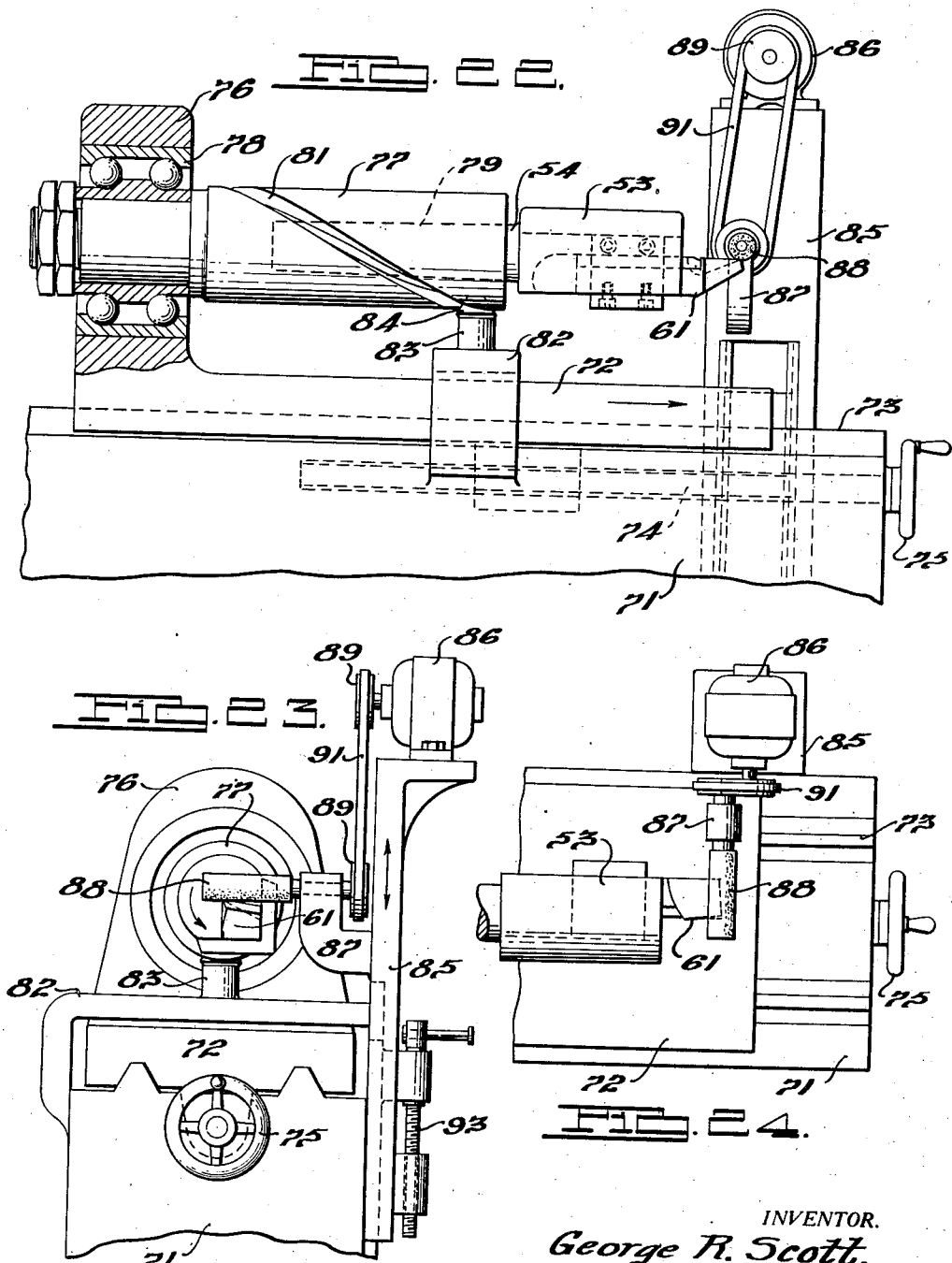

Patented July 19, 1938

2,124,126

UNITED STATES PATENT OFFICE 2,124,126

CUTTING TOOL

George R. Scott, Norfolk, Va., assignor, by mesne assignments, to Michigan Tool Company, Detroit, Mich., a corporation of Delaware Application July 19, 1934, Serial No. 735,971

5 Claims. (Cl. 29—103)

My invention relates to cutting tools and particularly to the teeth of cutting tools employed for machining the worm, of globoidal type worm gearing, to accurate predetermined form.

The globoidal type of gearing is of particular advantage over other types of known worm gearing since surface contact is provided between several threads of the worm and several teeth of the worm wheel. On worm gearing heretofore employed a point contact only between a single thread and the teeth could be effected. As a result, the worm gear elements heretofore employed had a very short life owing to the concentrated load at the point of contact. The gouging of the metal and the rapid wearing away of the form, resulted in the destruction of the worm gear elements. The method of generating a worm gearing of the globoidal type has been clearly set forth in the Cone Patent No. 1,751,540, and in the Worm gear patent to Cone No. 1,822,800.

The present invention relates to tools and the cutting teeth thereof which will accurately form the thread on the worm to desired sinuous shape. As is evident from the above noted patents, the cutting edges of the teeth must be straight lines which coincide with tangents to a base circle which is concentric to the axis of the tool. The teeth are fed into the worm blank to form gaps after which the tool is relatively advanced and retarded a predetermined amount to cut first on one side of the thread or threads and then on the other in the center plane of the worm gear to widen the gaps in both directions and to form the accurate sinous surfaces on the thread sides. A roughing tool of narrow width may be employed to first cut the gap or groove to predetermined depth so as to extend the life of the cutting edges of the more accurate tools herein described. The in-feeding of the teeth deforms the side of the thread from the sinuous form desired so that it is necessary to finish the side by widening the gap, on the axial plane of the worm gear, by advancing and retarding the tool angularly about its spindle to reform the side to predetermined accurate sinuous shape which will accurately mate with the surfaces of the teeth of the worm wheel when likewise formed. In this manner surface contact will be obtained over several of the teeth and long life will be provided to the worm gear elements.

The present invention employs cutters of the solid and inserted blade type, the solid type being employed for small units, while the inserted blade type is preferably employed for the larger units. When small units are employed with a very slow lead, the teeth of the cutters are only at a small angle from the axis of the tool and acute angle cutting edges on both sides of the teeth will be provided by merely grooving the tops of the teeth, as is well known tool practice. However, when steeper angles are utilized for the thread of the worm elements, other means must be provided to obtain the acute angle cutting edges disposed in the same plane after a sharpening operation. It is to this particular tooth form, various examples of which are illustrated and will now be described, that this invention is directed.

The teeth are usually provided in pairs which operate independent of the other, one tooth of each pair operating on one side of the thread to form the surface thereof to predetermined desired shape, while the other tooth of the pairs operates independent of the first teeth to finish the opposite surface of the thread. The teeth thus disposed in pairs, have the cutting edges in the same plane, all lying on tangents to a base circle concentric to the axis of the tool. On both of the teeth, angularly disposed surfaces are provided which intersect the sides to form the cutting edges. It is only necessary to machine the top surfaces which intersect the sides to resharpen the tool and retain the cutting edges in the same plane. As pointed out above, the cutting edges must reside in the same plane so that cutting will occur in the plane through the axis of the worm gear element. In one form of tooth to be described, the sides are disposed on a helix about the axis of the tool. On another form a side may be disposed on a helix about the axis of the tool as above described and the top face disposed on a helix about the cutting edge which is tangent to the base circle or, on a most desired form, both the side and the top face may be disposed on a helix about the cutting edge tangent to the base circle of the tool. Any of these forms of teeth may be disposed in the built-up type of tool or the solid type as is desirable.

Accordingly, the main objects of my invention are to provide a tool for accurately machining worm threads which have the cutting edges disposed tangent to the base circle and formed by sides in acute angled relation; to provide tools of the solid or built-up type having teeth which may be arranged in pairs with the adjacent cutting edges forming tangents to a base circle and intersected by top planes which are disposed at an angle to a plane normal to the tool axis to form acute angle cutting edges; to provide teeth for a tool which are disposed on a helix about the axis of the tool having cutting edges disposed tangent to a base circle and having the side intersected by a top face which is at an angle to a plane normal to the axis of the tool and to each other; to provide teeth for a tool which are disposed on a helix about the axis of the tool with top faces which are formed on a helix about the line of intersection of the faces and sides which are tangent to circle concentric to said axis; to provide teeth for a cutting tool the cutting edges of which are disposed on a tangent to a base circle with the sides and faces forming said cutting edges, disposed on a helix about the tangent to the base circle; to provide a cutting tool with pairs of teeth, the cutting edges of each pair facing each other in the same plane and disposed on tangents to a base circle to operate first on one side of the thread of a worm with one set of teeth while the other set is inoperative and to operate on the other side of the thread of the worm with the other teeth when the first said teeth are inoperative; to provide a tool with teeth all of the same hand to finish the sides of a thread of a worm to predetermined form and when desirable to have the opposite side also finished to predetermined form by a second cutter similar to the first but with teeth of the opposite hand; and, in general, to provide a cutter with teeth for accurately finishing the side of a thread to predetermined dimensions with the cutting edges disposed on tangents to a base circle and the sides disposed on a helix about the axis of the base circle or the cutting edges to retain the cutting edge at all times tangent to the base circle after each sharpening operation.

Figure 20:
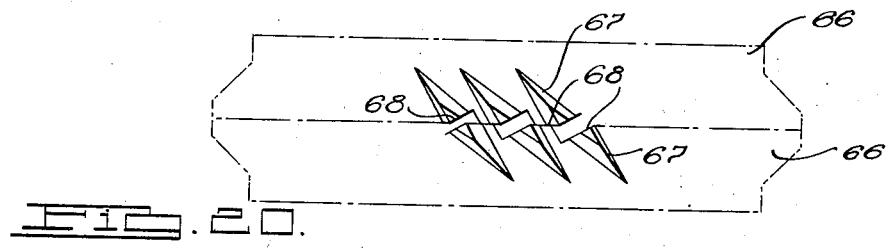
Figure 21:
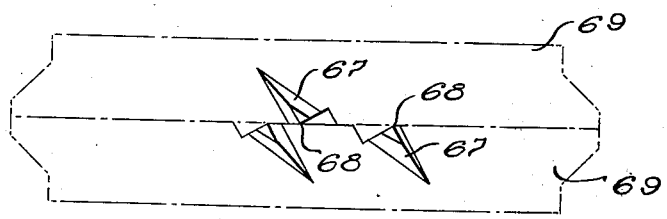

Other objects and features of novelty of my invention will be either specifically pointed out or will become apparent when referring, for a better understanding of my invention, to the following description taken in conjunction with the accompanying drawings, wherein:

Fig. 1 is a plan view of a tool of the solid type embodying features of my invention, Fig. 2 is a view in elevation of the tool illustrated in Fig. 1, Fig. 3 is a sectional view of the tool illustrated in Fig. 1, taken on the line 3—3 thereof, Fig. 4 is an enlarged sectional view of the structure illustrated in Fig. 1 taken on the line 4—4 thereof, Fig. 5 is an enlarged sectional view of the structure illustrated in Fig. 1 taken on the line 5—5 thereof, Fig. 6 is a broken plan view of a tool of the built-up type having teeth similar to the tool illustrated in Fig. 1, on inserted blades thereof, Fig. 7 is a sectional view of the structure illustrated in Fig. 6, taken on the line 7—7 thereof, Fig. 8 is a broken plan view of a built-up tool, similar to that illustrated in Fig. 6, showing a modified form thereof, Fig. 9 is an enlarged sectional view of the structure illustrated in Fig. 8, taken on the line 9—9 thereof, Fig. 10 is a broken plan view of a tool similar to that illustrated in Fig. 8, showing a further form of built-up tool, Fig. 11 is a sectional view of the structure illustrated in Fig. 10, taken on the line 11—11 thereof, Fig. 12 is a view in elevation of a holder and tool for producing helical forms thereon about the cutting edge, Fig. 13 is an enlarged end view of the structure illustrated in Fig. 12, Fig. 14 is an enlarged plan view of the tool after its removal from the holder of Fig. 12, Fig. 15 is an end view of the tool illustrated in Fig. 14, Fig. 16 is a side view of the tool illustrated in Fig. 14, with the tool disposed as in Fig. 12, Fig. 17 is a view of the left hand side of the tool in Fig. 16, as indicated by 17, Fig. 18 is a sectional view of the tool illustrated in Fig. 14 taken on the line 18—18 thereof, Fig. 19 is a broken plan view of a cutting tool showing a further form thereof, Fig. 20 is a fragmentary view, in elevation of the tool illustrated in Fig. 19, Fig. 21 is a view of structure similar to that of Fig. 20, showing a further form thereof, Fig. 22 is a view, partly in section and partly in elevation, of a grinding device for dressing the face of the tool illustrated in Figs. 12 to 17, inclusive, Fig. 23 is an end view of the device illustrated in Fig. 22, and Fig. 24 is a broken plane view of the device illustrated in Fig. 22.

Referring to Fig. 1, I have illustrated a solid tool 20 which has a plurality of teeth thereon disposed in pairs except for an odd tooth which may be employed for hunting purposes. Teeth 21 and 22 are employed in pairs to have a cutting edge 23 and 24 disposed on a tangent to a base circle 25 concentric to the tool. The teeth 21 and 22 have their sides 26 and 27 disposed on a helix about the axis of the tool. The side 27 of the teeth 21 of the tool is intercepted by a plane 28 which is disposed to intercept the tangent to the base circle of the cutting edge 23 and which will form with the side 27 an acute angle to provide an acute angle to the cutting edge 23. The tooth 22 has a face 29 which is in a plane which also intercepts the tangent to the base circle of the cutting edge 24 to intersect the side 26 of the tooth at an angle which is less than a right angle to provide a cutting edge 24 which is an acute angle.

The tool thus formed may be employed as a finishing tool when a roughing tool is first employed to rough out the worm providing gaps between the threads of less width than desired. When the present tool is employed, the teeth 21 are first utilized for cutting one side of the thread of the worm to predetermined dimensions during the time the teeth 22 are inoperative, after which the tool is angularly shifted to bring the cutting edge 24 of the teeth 22 into contact with the opposite side of the thread of the worm while the teeth 21 are inactive to finish the opposite side of the threads. This finishing operation widens the gap first in one direction and then in the other to predetermined width. During the widening operation, an accurate sinuous form is provided on the thread sides which will have surface contact engagement with the surface of the teeth of the worm wheel. For sharpening the tool it is only necessary to grind the planes 28 and 29 to provide new cutting edges 23 and 24 the grinding being such that the cutting edges are retained in the same plane so as to be capable of operating in the plane through the axis of the worm. While I have described a particular type of teeth on a solid cutter, it is to be understood that the same teeth may be employed on a built-up cutter.

This I have disclosed in Figs. 6 and 7 wherein teeth 31 and 32 are the same as the teeth 21 and 22 above described relative to Figs. 1 to 5, inclusive. It will be noted, however, in this construction that the cutting edges 23 and 24 are not directly facing each other but are oppositely disposed. This is desirable in view of the cutting edges residing on lines tangent to a base circle which do not intersect and which permits the base portion of the teeth to be clamped in the holder. By having the tangents of the cutting edges to the base circle, non-intersecting as in Fig. 1, the numbers of pairs of teeth are limited as is evident from the structure illustrated in Fig. 6.

In mounting the blades in the holder, I desire to follow somewhat the method disclosed in my co-pending application Serial No. 572,527, filed November 2, 1931. In this construction the tools are disposed at an angle parallel to the tangent of the base circle so that after the sharpening operation and after the cutting edge has receded below the plane through the worm axis and also from the plane tangent to the base circle, it is only necessary to move the tool upwardly into the plane of the axis of the worm gear to have the cutting edge disposed in the plane of the tangent to the base circle.

I employ a holder made up of an annular ring 38 having slots 33 cut entirely through to have the blade rest upon a base 30 and to be clamped thereon by a cover plate 34. The elements of the holder are retained together by a plurality of bolts 35 while the individual tools may be locked in predetermined position by screws 36. I have illustrated shims 37 provided between the bottom of the tools 31 and 32 and the base plate 30 to move the cutting edge upwardly into the plane of the worm wheel. The shims, however, can be eliminated and the tools clamped in original position so that the entire tool may be moved upwardly on a supporting arbor to have the cutting edges disposed in the plane of the worm wheel.

The tilting of the tool in the slot provides the desired clearance to the tool sides and at the same time eliminates the difficulty heretofore experienced after the sharpening operation when the cutting edge has receded from both planes, that is to say, the plane through the worm axis and that tangent to the base circle. In the present instance it is only necessary to move the tool either by moving the blades individually through the use of shims or by moving the entire tool upwardly into the plane of the worm axis.

When the slots 33 are disposed at the same angle, the machining of the top faces of the cutting tool equal amounts will retain the cutting edges tangent to the base circle and equally spaced from each other so that the tool may be moved bodily upward to bring the cutting edges in the plane of the axle of the cutting tool. When the slots 33 are otherwise disposed it is necessary to shim each individual blade upwardly into the original plane to bring the cutting edges tangent to the base circle in the same spaced relation to the adjacent tooth.

In Fig. 8, I have shown a further form of the invention wherein a tool holder is formed with a base portion 39 and a top portion 41 having oppositely disposed V-grooves 42 therein for engaging the corners of a tool. The tools 43 and 44 are disposed in pairs being provided with cutting edges 45 and 46, respectively, which are employed for cutting threads of greater lead. The teeth herein illustrated have the sides 47 formed on a helix about the axis of the tool while the top faces 48 are formed on a helix about the tangent to the base circle through the cutting edge 46. In this arrangement, the same relief will be provided at the top surface with the sides 47 which will provide a more uniform relief angle from the front end to the rear end of the teeth.

The teeth, of course, are constructed of the opposite hand as illustrated, the tooth 43 machines on the left hand side while the teeth 44 machines on the right hand side as viewed in the figures. It is to be understood that if separate holders are provided for the teeth 43 and for teeth 44, the individual cutters thus provided will be used alternately, the first cutter will machine on one side of the thread after which the second cutter will be utilized to machine the other side of the thread. In the arrangement shown the teeth are employed alternately, that is to say, the teeth 43 will cut the right hand side of the thread while the teeth 44 are inoperative, and the teeth 44 will cut the left hand side of the thread while the teeth 43 are inoperative. The gap between the threads will be widened in this manner and the sides of the threads will be cut to accurate predetermined form.

In Figs. 10 to 18, inclusive, I have shown a further form of tooth which is more desirable for threads having the faster lead. In this construction, in view of the slope to the threads, less stock will be provided for the cutting edge and, to provide the greatest amount of stock and obtain the same angle between the sides and the top surface, I generate both sides of the tooth forming the cutting edge on a helix about a base cutting edge which falls on the tangent to a base circle.

A holder 50 is provided similar to the holder of Fig. 8 with the exception that the teeth are all of the same hand being disposed to cut on one side of the thread of the worm. The base 39 and top clamping plate 41 are provided with the V-slot 42 while a ring 51 is provided having bolts 52 therein which are clamped against the rear end of the tools to retain them axially positioned relative to the center of the tool. The blades are all disposed on the same angle relative to the center to have the cutting edges coincide with tangents to the base circle, as clearly illustrated in Fig. 10.

The particular tools to be employed are shown more clearly in Figs. 12 to 19. In Fig. 12 a tool holder 53 is provided having a supporting shank 54 and a head 55, in the latter of which a square notch 56 is disposed having the apex 57 of the notch coincide with the centerline through the holder 53. A tool 61 of square shape is clamped in square notch 56 by suitable clamping element 58 secured by a plurality of bolts 59 to the head 55. It will be noted that the rotation of the holder 53 about its axis will roll the tool 61 about its edge 62, which is the cutting edge of the tool.

A device for producing the rolling and the advancement of the cutting edge relative to a grinding wheel is illustrated in Figs. 22, 23 and 24. The device includes a bed 71 on which a table 72 is movable on ways 73 by a lead screw 74 operated by hand wheel 75. The table 72 carries a bearing support 76 in which a stub arbor 77 is supported and rotatably mounted in a bearing 78. The arbor 77 is provided with an axially disposed aperture 79 in which the shank 54 of the tool holder 53 illustrated in Fig. 12 is supported. The arbor is also provided with a slot 81 disposed in a helical path of a lead chosen relative to the helical face to be ground on the tool 61. The bed 71 is provided with a saddle 82 having a projecting stud 83 on which a roller 84 is provided to project into the slot 81. The saddle 82 straddles the table 72 and permits its movement thereunder. An upright 85 is also supported by the bed 71 and is the means of supporting a motor 86 and a bracket 87, the latter of which supports the grinding wheel 88. Suitable pulleys 89 are provided on the shaft of the wheel 88 and motor 86 interconnected by a belt 91. The grinding wheel 88 is herein illustrated as of the pencil type providing a line contact with the surface of the tool 61 to be ground. The tool is adjusted relative to the surface to be ground through the movement of the upright 85 relative to the bed 71 on a suitable dovetail support 92 through the operation of a lead screw 93.

In operation the hand wheel 75 is operated to produce the advancement of the table 72 and therefore, the tool 61 relative to the bed 71 and the grinding wheel 88. During this advancement the stub shaft 77, the fixture 53 and the tool 61 are rotated through the engagement of the roller 84 in the slot 81. The slot 81, being disposed in a helical path, will cause the turning movement as the table and arbor are advanced relative to the fixed saddle 82. In this manner, while grinding a straight line on the face of the tool 61, the surface produced thereby will be of helicoid form. When two such adjacent surfaces are dressed in this manner, their adjoining edges will be a straight line. Any plane passing through the tool normal to the cutting edge will intersect the ground surfaces in straight lines, since the surfaces are formed by a straight line contact with the grinding wheel. The cutting edge produced in this manner has the same angle of relief thereto from the crown to the root of the tooth and identical cutting characteristics will be provided throughout the length of the cutting edge. The tooth is materially strengthened when the faces are dressed in this manner, since additional material will be present to provide additional strength to the tool tip.

A single blade may be employed in the holder to machine the thread of a worm or a plurality of blades may be mounted in the holder and the tool thus formed may be driven in synchronism with the work and advanced or retarded angularly as the case may be to move the cutting edges into the sides of the thread to be finished, to cut a true form therein and to widen the gaps to desired dimension. A second tool is then provided for machining the opposite side of the thread or as is sometimes desirable the worm may be turned endwise 180 degrees to present the opposite side of the thread to the teeth of the same cutting tool and in this manner a single tool may be utilized for machining both sides of the thread of a worm. It is to be understood that the various teeth herein illustrated may be employed on a solid type of cutter or on any type of built-up holders as illustrated or which are known in the art to be suitable.

In Figs. 19, 20 and 21 I have illustrated a pair of tools which may be employed alone or together as illustrated in the figures for producing the widening of the gaps between the threads of the worm first by machining on one side and then the other side of the threads. The tools may be similar to any hereinbefore specified with the exception of having all of the teeth alike and capable of cutting on one side of the thread. The tools 66 are exactly alike and are provided with the same teeth 67 which have a cutting edge 68 on one side only. One tool may be employed alone for machining first one side of the threads to proper form after which the tool may be turned through 180 degrees to machine downwardly when the rotation of the worm and tool are reversed to machine the opposite side of the thread. The worm wheel itself may be turned end for end, as pointed out hereinabove, and driven in the same direction to have the cutting edge 68 available for cutting the opposite side from that originally cut.

By employing two of the tools and mounting one facing upwardly and the other facing downwardly, as illustrated in Fig. 20, no change in the set-up is required. The teeth are substantially aligned on the same helix angle with the cutting edges 68 extending beyond the relieved side of its aligned tooth so as to be available for cutting purposes. The cutter in this manner has the cutting edges 68 on both of the tools 66 in the same central plane available to be angularly shifted in one direction to have the cutting edges on one tool cut on one side of the threads of the worm after which the cutter is shifted in the opposite direction and its rotation and that of the worm reversed to have the cutting edges 68 on the other tool 66 available for cutting the opposite side of the thread. In this arrangement, neither the gear nor the worm need be changed, it being only necessary to reverse the operation of the machine.

In Fig. 21 the two tools 69 shown therein are similar to the tool 66 of Fig. 20 having like teeth 67 and like cutting edges 68 with the exception that the alternate teeth are omitted to provide greater clearance for the chips and for the grinding operation when constructing and sharpening the teeth. In either instance the cutting edges are aligned on the same central plane so as to cut on the central plane through the worm gear, which is necessary to produce the proper sinuous form on the side of the threads. The individual tools 69 of Fig. 21 could likewise be employed alone for effecting the machining as specified with regard to the cutter 66 of Figs. 19 and 20.

The two tools could be employed on two arbors, one on each side of the gear, each of which would be advanced in opposite directions to cut on opposite sides of the threads at the same time. Like tools would be employed having cutting edges on the same side which, when disposed on opposite sides of worm, would machine opposite sides of the threads. Like cutters would be available, when disposed in this manner, for finishing both sides of the thread in a single operation when side feeding both cutters in unison. The cutting could be effected by advancing one tool to cut the one side of the threads after which the other tool would be advanced to cut the opposite side of the threads. The J. C. Drader application Serial No. 719,646, filed April 9, 1934, discloses a machine for employing two such like tools to be advanced at the same time in opposite directions for widening the thread gaps and forming the sides of the thread to accurate sinuous shape.

The teeth of the various solid and built-up type tools herein described and illustrated may have the helicoid faces formed thereon by revolving the tool as it is advanced relative to the grinding wheel or the grinding wheel itself may be revolved as it rotates and is advanced relative to the tooth of the tool or blade. It is within the purview of my invention to dress a helicoid form only on the side face of the teeth and to dress a plane surface on the top thereof to provide the additional material and substantially the same relief to the cutting edge throughout its length without requiring the special fixture to be employed during a sharpening operation. While tools of this type may not be as desirable and as accurate as the tool in which two faces of helicoidal form intersect to produce the cutting edge, a material advancement in the art is provided when at least one face having helicoidal form is utilized.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A tool for machining globoidal worms comprising a rotatable member having a plurality of pairs of peripheral teeth, each of said teeth having a side face and an axial end face intersecting in a straight line to form a cutting edge, all of said cutting edges lying along lines tangent to a common circle whose axis coincides with the axis of rotation of said rotatable member, all of said cutting edges lying in a common plane perpendicular to the axis of rotation of said member, the side faces of each of said teeth being warped surfaces generated about the cutting edges as a directrix whereby the angle of approach of said cutting edge with respect to the thread of a worm being machined will be substantially constant from the root to the crest of said thread.

2. A tool for machining globoidal worms comprising a rotatable member having a peripheral tooth thereon, said tooth having a side face and an axial end face intersecting in a straight line to form a cutting edge, said cutting edge lying along a line tangent to a circle whose center coincides with the axis of rotation of said member, said cutting edge lying in a plane perpendicular to the axis of rotation of said member, the side face of said tooth being a warped surface generated about the cutting edge as a directrix whereby the angle of approach of said cutting edge with respect to the thread of a worm being machined will be substantially constant throughout the effective length of said cutting edge.

3. A tool for machining globoidal worms comprising a rotatable member having a peripheral tooth thereon, said tooth having a side face and an axial end face intersecting in a straight line to form a cutting edge, said cutting edge lying along a line tangent to a circle whose center coincides with the axis of rotation of said member, said cutting edge lying in a plane perpendicular to the axis of rotation of said member, the side face and axial end face of said tooth being warped surfaces generated about the cutting edge as a directrix whereby the angle of intersection of said surfaces at said cutting edge will be substantially constant throughout the length of said cutting edge.

4. A tool for machining globoidal worms comprising a rotatable member having a peripheral tooth thereon, said tooth having a side face and an axial end face intersecting in a straight line to form a cutting edge, said cutting edge lying along a line tangent to a circle whose center coincides with the axis of rotation of said member, said cutting edge lying in a plane perpendicular to the axis of rotation of said member, the side face of said tooth being a helicoidal surface whose axis lies in said cutting edge whereby the angle of approach of said cutting edge with respect to the thread of a worm being machined will be substantially constant throughout the effective length of said cutting edge.

5. A tool for machining globoidal worms comprising a rotatable member having a peripheral tooth thereon, said tooth having a side face and an axial end face intersecting in a straight line to form a cutting edge, said cutting edge lying along a line tangent to a circle whose center coincides with the axis of rotation of said member, said cutting edge lying in a plane perpendicular to the axis of rotation of said member, the side face and the axial end face of said tooth being helicoidal surfaces having a common axis, which axis coincides with said cutting edge whereby the angle of intersection of said surfaces at said cutting edge will be substantially constant throughout the length of said cutting edge.

GEORGE R. SCOTT.